United States Patent
Werges

[11] 3,901,943
[45] Aug. 26, 1975

[54] PROCESS FOR MAKING ACRYLAMIDE

[75] Inventor: Darrell L. Werges, Park Forest, Ill.

[73] Assignee: Nalco Chemical Company, Chicago, Ill.

[22] Filed: Dec. 3, 1973

[21] Appl. No.: 421,117

[52] U.S. Cl......... 260/561 N; 252/477 Q; 260/557 R
[51] Int. Cl............................................. C07c 103/08
[58] Field of Search......... 260/557 R, 561 R, 561 N; 252/463, 476, 477 Q; 75/139

[56] References Cited
UNITED STATES PATENTS
3,767,706   10/1973   Habermann et al............ 260/561 N

*Primary Examiner*—C. Davis
*Attorney, Agent, or Firm*—Hill, Gross, Simpson, Van Santen, Steadman, Chiara & Simpson

[57] ABSTRACT

A continuous process for catalytically hydrolyzing acrylonitrile to acrylamide under preferably homogeneous, liquid phase conditions. Acrylonitrile and water are fed to two or more sequential tubular reaction zones, each maintained at from about 100° to 300°F using a weight hourly space velocity of from about 0.1 to 10. Substantially all of the water is passed through each reaction zone, while acrylonitrile is incrementally added to each reaction zone. Each reaction zone is operated at a conversion level of at least about 70% based on total acrylonitrile fed into the system up to that point. The product concentrated aqueous solution of acrylamide may be used as such or subjected to a brief stripping operation to recover unconverted acrylonitrile.

39 Claims, 5 Drawing Figures

3,901,943

PROCESS FOR MAKING ACRYLAMIDE

BACKGROUND OF THE INVENTION

In the art of catalytically hydrolyzing acrylonitrile with water to acrylamide two routes have heretofore been taught. One route involves a dilute (7 weight percent being typical) aqueous solution of acrylonitrile and water being hydrolyzed to acrylamide with a copper catalyst system, such as a reduced copper containing catalyst, or a mixture of copper oxide with silver, zinc, or cadmium oxides (see U.S. Pat. Nos. 3,597,481; 3,631,104; and 3,642,894; and West German DOS 2,110,903, all apparently assigned to Dow Chemical Company, Midland, Mich.). The other process involves a continuous conversion in which the catalyst is suspended in an acrylonitrile/water system in the circulation zone of a reactor using in one mode a reactor especially designed so that the suspended catalyst can be separated from the reactant liquid in a catalyst precipitation zone which is so constituted that it is essentially connected with a reaction zone. (See West German DOS 2,240,783 and also West German DOS 2,241,732 apparently assigned to Mitsui Chemical Company, Tokyo, Japan).

Each of these processes suffers from serious disadvantages. In the case of the Dow process, according to the examples in the patents cited, a product solution containing only about 8.4 weight percent (wt.%) acrylamide is typically produced at 90 wt. % conversion of acrylonitrile to acrylamide from a 7 wt. % acrylonitrile feed. To concentrate such a solution to a desired concentrated product aqueous solution containing 50 wt. % acrylamide, it is necessary to evaporate about 9.8 pounds of water per pound of acrylamide. Such an evaporation procedure requires specialized apparatus, such as a stripper or evaporator, and involves costly inefficient operating conditions.

Concentrated solutions of acrylamide in water are desired because such solutions can then be employed directly for the manufacture of aqueous polyacrylamide latex polymers. Also, when an aqueous solution of acrylamide is to be an item of commerce, the most concentrated possible solution is desired in order to minimize shipping costs (owing to inherent water content). Even if one desired to sell acrylamide as a crystalline solid product, which is the way a substantial quantity of acrylamide is apparently currently sold commercially, it would be necessary first to crystalize the acrylamide from a dilute starting aqueous solution prepared by catalytic hydrolysis. Since the solubility of acrylamide in water is relatively high, a concentrated solution feed is required for a crystallization process so a costly evaporation step would still be needed. Consequently, there is a need in the art for a process which will permit one to make with as little stripping as possible concentrated solutions of acrylamide and water.

In the case of the Mitsui process, a back-mixed, suspensiontype reactor system is employed. In the hydration of acrylonitrile to acrylamide, the reaction rate inherently decreases with increasing conversion percentages so that a back mixed reactor design results in the largest possible reactor or catalyst charge for a given degree of conversion of acrylonitrile to acrylamide. Thus, by this process, it is particularly difficult to achieve high conversion levels particularly at high reaction rates. Observe that the Mitsui examples show only about a 50% conversion and a reaction product containing only about 20% acrylamide, so that, for producing a concentrated product, a relatively large amount of water and acrylonitrile must be evaporated. Another problem with the Mitsui process arises because of the unavoidable apparent consumption of catalyst owing to the inherent generation of catalyst fines which are not separable in the catalyst recovery portion of the Mitsui suspension reaction system.

Nothing in the prior art processes for catalytically hydrolyzing acrylonitrile to acrylamide teaches the use of sequential reaction zones in which substantially all of the water passes through each reaction zone while the acrylonitrile is fed incrementally to each of the reaction zones, resulting in the direct production of a high purity, concentrated product aqueous solution of acrylamide in water which requires little, if any (depending upon type of product desired), subsequent stripping to remove unreacted acrylonitrile and excess water. Nothing in the prior art permitted the use of a combination of high conversion percentages with such sequentially enriched starting feeds hydrolyzed at relatively rapid reaction rates.

The problem of producing directly a concentrated solution of acrylamide and water has proven to be difficult to solve, for it is not possible simply to increase the concentration of acrylonitrile in a starting feed of acrylonitrile/water being fed to a continuous prior art reactor. Thus, for one thing, it is difficult to control in a reaction zone the hydrolysis reaction occurring in such a concentrated feed because of the characteristically high exotherm and the high initial rate of reaction associated therewith. For another thing, so far as is known, the catalysts heretofore chosen for use in the prior art processes did not have appropriately high catalytic activity of the type needed for high conversion rates when placed into a fixed bed in a substantially isothermal reactor and subjected to plug flow type movement of reactants therethrough.

Production of a concentrated acrylamide solution in a reactor which is approximately plug flow causes several problems which are unique to operating in this manner. For one thing, one must employ a reaction zone from which heat may be removed continuously and at a high rate. For example, if one has a dilute reactor feed of 7 percent acrylonitrile in water, sufficient water is available as a heat sink to eliminate the need for heat removal from the reactor, but in contrast, for a 35 weight percent acrylonitrile/water feed reacted to a 90 percent conversion, there is an adiabatic temperature rise of 200°F. which results in such a high reactant temperature that undesirable side reactions inherently occur (such as polymerization) so that, under such latter process conditions, heat must be removed during the hydrolysis reaction. While it is possible to prevent the initial uncontrolled temperature rise by conducting the reaction at a low temperature where the initial rate would be slow enough to allow close control of the initial exotherm, unfortunately, if the entire reaction is conducted at this temperature, the reaction rate above about 60 percent conversion becomes so slow than an impractically large bed of catalyst is required to achieve high conversion levels and high acrylamide concentrations.

Another problem arises from the discovery that, at acrylonitrile conversion levels of up to about 30 percent with concentrated acrylonitrile feeds, the reaction rate is surprisingly higher than the reaction rate above conversion levels of about 60 percent. Thus, if one attempts to conduct such a hydrolysis reaction in a single reaction zone to a conversion level of, say, about 80 percent it becomes necessary to use a high reaction zone temperature to compensate for the reduced conversion rates above about 60 percent. Such a high temperature results in a virtually uncontrollable exotherm in the initial phases of the reaction owing to the much faster rates of conversion at such lower initial levels of conversion. On the other hand, if one attempts to perform the initial phases of the hydrolysis reaction in a controllable manner using a concentrated acrylonitrile feed in a single reactor by operating at low temperatures, then the reactor needed to achieve a high conversion such as 80 percent can become extremely large due to the low reaction rates above about 60 percent conversion. This effect is considerably greater than would be expected from simple depletion of acrylonitrile reactant, and it appears that high concentrations of acrylamide may inhibit the further conversion of acrylonitrile. Consequently, simultaneously achieving a high degree of conversion and a high acrylamide concentration presents a particularly difficult problem.

Still another problem is that, when one uses a concentrated acrylonitrile/water starting feed, there is inherently a two-phased system involved owing to the limited solubility of acrylonitrile and water. If one uses, for example, a tubular reactor having a plurality of spaced, parallel tubes, it becomes difficult to uniformly provide to each of these reactor tubes an identical two-phased mixture of acrylonitrile and water. Those tubes which happen to receive a higher concentration of acrylonitrile then develop an even higher exotherm than do the tubes which receive an average or lower than average quantity of acrylonitrile which aggravates the difficulties of obtaining controllable reaction conditions particularly in initial reaction phases.

So far as known, no one has heretofore discovered a commercially practical, continuous process for fixed catalyst bed acrylonitrile hydrolysis using sequential substantially isothermal reaction zones, using incremental addition of acrylonitrile to each zone with substantially all of the water passing through all of the zones, using substantially plug flow of reactants in each zone and using a maximized, weight-hourly space velocity for the reactant composition which results in a minimum catalyst bed volume. Furthermore, no one has heretofore suggested incremental addition of acrylonitrile to a flowing reactant mixture comprising acrylonitrile and water as a part of a process for achieving production of acrylamide at high conversion rates and high levels of conversion.

BRIEF SUMMARY OF THE INVENTION

This invention is directed to a new and very useful process for catalytically hydrolyzing acrylonitrile to acrylamide under substantially liquid phase conditions. Acrylonitrile is incrementally added to an aqueous system continuously being passed sequentially through at least two tubular reaction zones in a plug flow manner. The process is believed to overcome shortcomings of the prior art and problems associated with the hydrolysis of acrylonitrile under conditions of high levels of conversion and rapid rates of reaction using a homogeneous (preferably) feed of acrylonitrile and water. The process is adapted to produce a concentrated solution of acrylamide in water.

An object of this invention is to provide a process for catalytically hydrolyzing an incrementally acrylonitrile enriched water/acrylonitrile feed under liquid phase conditions using a plurality of reaction zones each operated at relatively high conversion (e.g., typically above about 60% though lower rates can also be used) and relatively high reaction rates which process can be operated for extended periods of time.

Another object is to provide a multistage process for producing concentrated aqueous solutions of acrylamide by direct catalytic hydrolysis of acrylonitrile using a minimized reactor volume for a given production rate within the constraint that the reaction temperatures are easily controlled.

Another object is to provide a practical process of the type indicated which overcomes the problems associated with catalytically hydrolyzing acrylonitrile to acrylamide under homogeneous liquid phase conditions in a manner which directly achieves concentrated acrylamide solutions at high conversion rates.

Another object is to provide a commercially practical continuous process for fixed catalyst bed hydrolysis of acrylonitrile with water to acrylamide using a homogeneous, incrementally acrylonitrile enriched feed stream, a maximizable weight hourly space velocity, a maximizable conversion of acrylonitrile to acrylamide, a minimizable catalyst bed volume, and a maximizable overall reaction rate.

Another object is to provide such a continuous process wherein a plurality of reaction zones (preferably similar) are used (e.g., two, three or four, as desired), and, further, wherein each reaction zone of such plurality may optionally be utilized under varying process conditions by changing reactor zone sequence while the process is being continuously operated.

Another object is to provide such a process wherein one or more of a plurality of reaction zones may be temporarily removed from service, as for repacking with fresh catalyst, without process shut down, by reducing weight hourly space velocity, and/or increasing the respective zone temperatures, even though in these situations process efficiency is thereby reduced.

Another object is to provide in a continuous such process a technique for minimizing production problems without a complete process shut down caused by catalyst deactivation owing to what may be the characteristic tendency for a catalyst to deactivate more rapidly near a fresh feed inlet than in downstream locations relative thereto.

Another object is to provide such a process which is easy, reliable and simple to control, and where little or even substantially no side reactions occur, and where conventional simple, economical, apparatus may be employed for conducting the process.

Another object is to provide such a process which uses relatively low, substantially isothermal, liquid phase temperature conditions over a plurality of plug-flow, continuously operating, reaction zones and wherein each zone can comprise a plurality of tubular spaces wherein feed phase distribution problems are minimizable.

Another object is to provide such a process which uses a catalyst presently (preferably copper) having a level of initial conversion activity which exceeds a minimum level.

Another object is to provide such a process wherein the level of conversion of acrylonitrile to acrylamide is such that a concentrated (e.g., above about 30 to 35 wt. % total weight basis) solution of acrylamide is directly produced by hydrolysis.

Another object is to provide such a process wherein conversion can be carried to the point where the product solution needs little or no stripping to remove unreacted acrylonitrile before use, and wherein, even after stripping, a concentrated product acrylamide solution (e.g., above about 40 to 45 wt. % total weight basis) of high purity is produced.

Other and further objects, purposes, advantages, utilities, and features will be apparent to those skilled in the art from a reading of the present specification and drawings.

DETAILED DESCRIPTION

Figure 1:
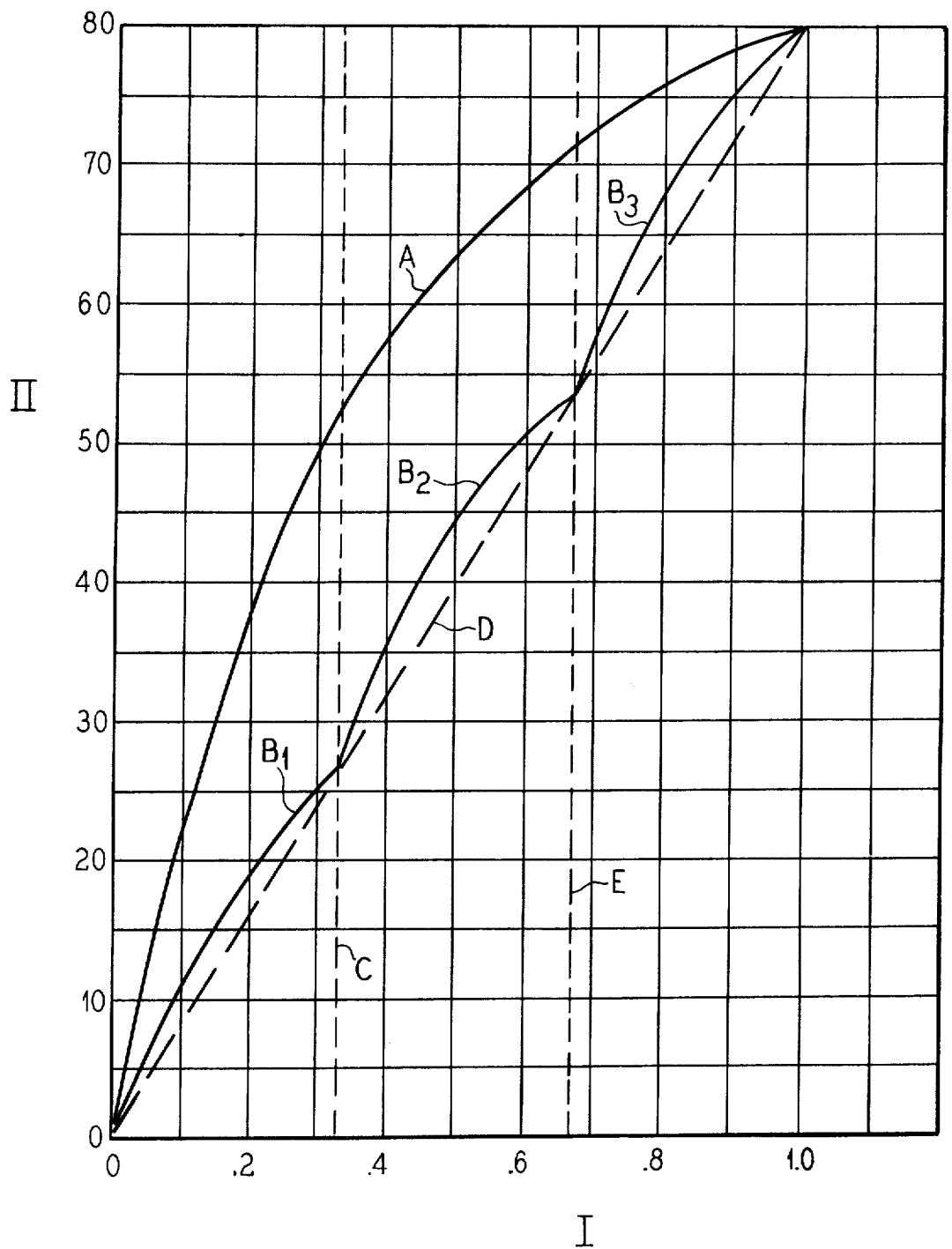
FIG. 1 provides illustrative plots of one embodiment of this invention showing the percent conversion of acrylonitrile as ordinate (II) versus contact time in hours (shown as the reciprocal of weight hourly space velocity for a mixture of acrylonitrile and water) as abscissa (I)

The present invention is directed to a continuous process for catalytically hydrolyzing acrylonitrile to acrylamide. This process involves continuously moving water under liquid phase conditions through at least one elongated substantially plug flow reaction zone.

To the reactant liquid thus in such a zone or zones at no less than two locations along such zone or zones one adds acrylonitrile. There is at least one such addition location immediately before or within each of such zones if more than one such zone is present. The total rate of such addition is such that the total weight percent of water in said liquid phase in such zone or zones declines from a maximum to a minimum between the first and the last of such locations after mixing. The quantity of acrylonitrile so added at each such location can range from above 0 upwards but preferably ranges from about 0.5 to 1.5 times (and more preferably from about 0.75 to 1.25 times) the total quantity of acrylonitrile charged to all such locations divided by the total number of such locations. The calculated weight ratio of total acrylonitrile charged to total water charged ranges from about 1:3 to 3:1 (and preferably from about 0.4 to 0.7 for a homogeneous system).

Each one of such reaction zones contains a fixed catalyst bed. The catalyst in each of said beds is generally characterized by having an initial activity of at least about 0.25 based upon a starting feed composition of 35 wt. % acrylonitrile and 65 wt. % water, total composition basis and using a catalyst bed volume of about 50 cubic inches and a weight hourly space velocity which is sufficient to produce about 80% conversion of acrylonitrile to acrylamide (see procedure in Example 1 below).

This process is conducted substantially isothermally at individual reaction zone temperatures each in the range of from about 100° to 300°F (a range of from about 150° to 250°F is preferred). The process uses a system weight hourly space velocity in the range of from about 0.1 to 10 hours $^{-1}$ (preferably ranging from about 0.5 to 2).

The process preferably obtains a total system conversion of starting acrylonitrile to acrylamide of at least about 60 percent (more preferably at least about 70%, and most preferably at least about 80%. Preferably, each of the reaction zones is maintained at a substantially constant temperature, and, in one presently preferred embodiment, each successive reaction zone is maintained at a higher temperature than the preceding reaction zone.

Preferably the process of this invention uses three reaction zones, though two, four, five six or even more such zones can be employed.

The catalyst used in the process typically has an activity of not more than about 2 (though more active catalysts can be used), and, more preferably, such activity is in the range from about 0.45 to 1.5. Typically the catalyst is in the form of particles ranging in size from about 0.01 to 0.49 inch, and preferably ranging in size from about 0.02 to 0.3 inch. Generally, any catalyst having such characteristics may be used. Presently, such catalyst is preferably a copper containing catalyst, and, more preferably, is a Raney copper catalyst.

Typically, a product produced by the process of the invention comprises on a 100 weight percent basis from about 30 to 60 weight percent acrylamide, from about 1 to 20 weight percent acrylonitrile, and from about 40 to 65 weight percent water, and, preferably, from about 35 to 50 weight acrylamide, from about 2 to 10 weight percent acrylonitrile, and from about 40 to 60 weight percent water. Obviously, as those skilled in the art will appreciate, while one can prepare by the process of this invention relatively dilute aqueous solutions of acrylamide, a preference, and, indeed, a primary aim of this invention, is to permit one to prepare such aqueous solutions directly in a highly concentrated form. A limiting factor in a product solution comprises, of course, solubility limits of acrylamide in water at particular conditions, such as room temperatures.

A product liquid mixture produced by the process of this invention is preferably subjected to stripping to recover therefrom unreacted acrylonitrile. Conveniently, recovered acrylonitrile is recycled back to at least one of the reaction zones. Preferably recovered acrylonitrile is recycled back to the first of said reaction zones in admixture with a fresh acrylonitrile feed. Typically, such stripping is carried out at temperatures ranging from about 100°F to 212°F at pressures ranging from about 50mm to 760mm Hg (times of less than about 8 hours are preferred). Typically, the so-stripped product comprises, on a 100 wt. % basis, from about 40 to 60 wt. % acrylamide and from about 40 to 60 wt. % water, and, preferably, from about 45 to 55 wt. % acrylamide with the balance up to 100 wt. % being water though higher (and lower) acrylamide contents can be achieved if desired.

In practicing the present invention, acrylonitrile is incrementally added to control the heat of the hydrolysis reaction of a reactant system moving through at least two elongated reaction zones. The water and hydrolyzed acrylamide present acts as a heat sink to absorb reaction exotherm without interfering with temperature control or an optimization of desired system high conversion and high conversion rate. The process is preferably operated with an ascending temperature profile to accelerate reaction in second and subsequent successive reaction zones or stages and to enhance achievement of desired high conversion levels in preferably minimum overall catalyst bed volume. Two sequential reaction zones at different temperatures are sufficient to allow good temperature control and minimum bed volume. The zones employed to practice this invention do not necessarily have to be in separate reactors, but can be a single reactor with, for example, two separate jackets each with a different coolant temperature.

The use of three or more separate reactors has a number of advantages primarily related to flexibility in a commercial plant. For example, three reactors in combination have the advantage that, if one reactor is shut down for maintenance, the other two can still be run in a manner which allows good temperature control. Four or more reactors can obviously be used, but for an initial design this could represent an unnecessary complication. The use of four or more reactors is primarily important as a convenient method of future plant expansion, as those skilled in the art will appreciate.

It is expected that the catalyst in the first reaction zone will normally deactivate more quickly than the catalyst in the subsequent reaction zone because, for one thing, in a commercial embodiment of this invention the first reaction zone is usually subjected to impurities present in minor amounts in the feed, such as dissolved oxygen, metal ions in the water, and possible organic contaminants present in the acrylonitrile. While ideally such contaminants could be controlled at low levels, plant practice is not ideal and impurities will occassionally be introduced into the reaction zones.

Figure 3:
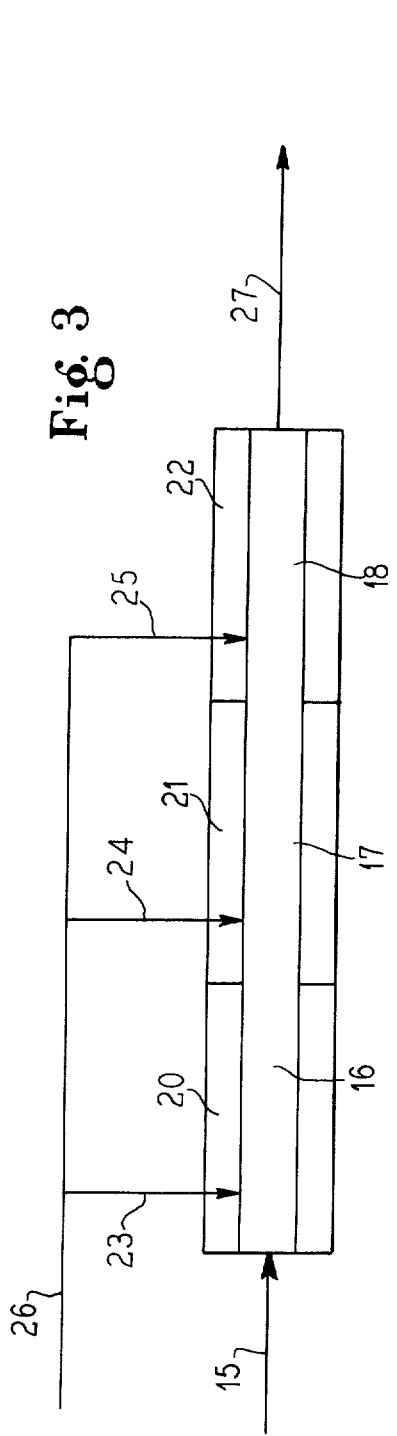
FIG. 3 shows a schematic flow diagram illustrating the practice of the present invention.

The reaction zones employed in the process of this invention are preferably of the conventional shell and tube reactor design. The catalyst is packed inside the tube or tubes as a fixed bed and the exothermic hydration reaction is accomplished inside the tubes while a cooling medium is circulated through the shell side to remove the heat of reaction and ideally maintain approximately isothermal conditions in the catalyst bed. The number of tubes can vary widely. Small scale operations within the teachings of this invention have been successfully conducted in but a single tube reactor used as a reaction zone. Large commercial scale operations require typically a bundle of at least 50 tubes, preferably more, to keep tube length to a practical value, for each reaction zone. Referring to the drawings, there is seen in FIG. 3 a representative flow diagram for the process of the present invention. Water through line 15 is continuously fed into and through a plurality of tubular reaction zones 16, 17 and 18, the number of such zones ranging from as low as two up to any desired number, though three is particularly preferred. The temperature of each zone 16, 17 and 18 is regulated by respective jacketing means 20, 21 and 22 associated herewith. Acrylonitrile is sequentially added to the water in each zone 16, 17 and 18 through feed lines 23, 24 and 25 branching from a main line 26, the number of such lines ranging from as low as two up to any desired number, though one feed line per zone is preferred, more preferably near the beginning of each zone. Hydrolysis of the acrylonitrile to acrylamide occurs in each zone 16, 17 and 18 and a product mixture of water, acrylamide and acrylonitrile is removed through a product line 27 from the end of the last reaction zone, here zone 18. Temperatures and other process conditions, weight hourly spaced velocity, zone conversions and conversion rates are as elsewhere indicated herein.

Figure 4:
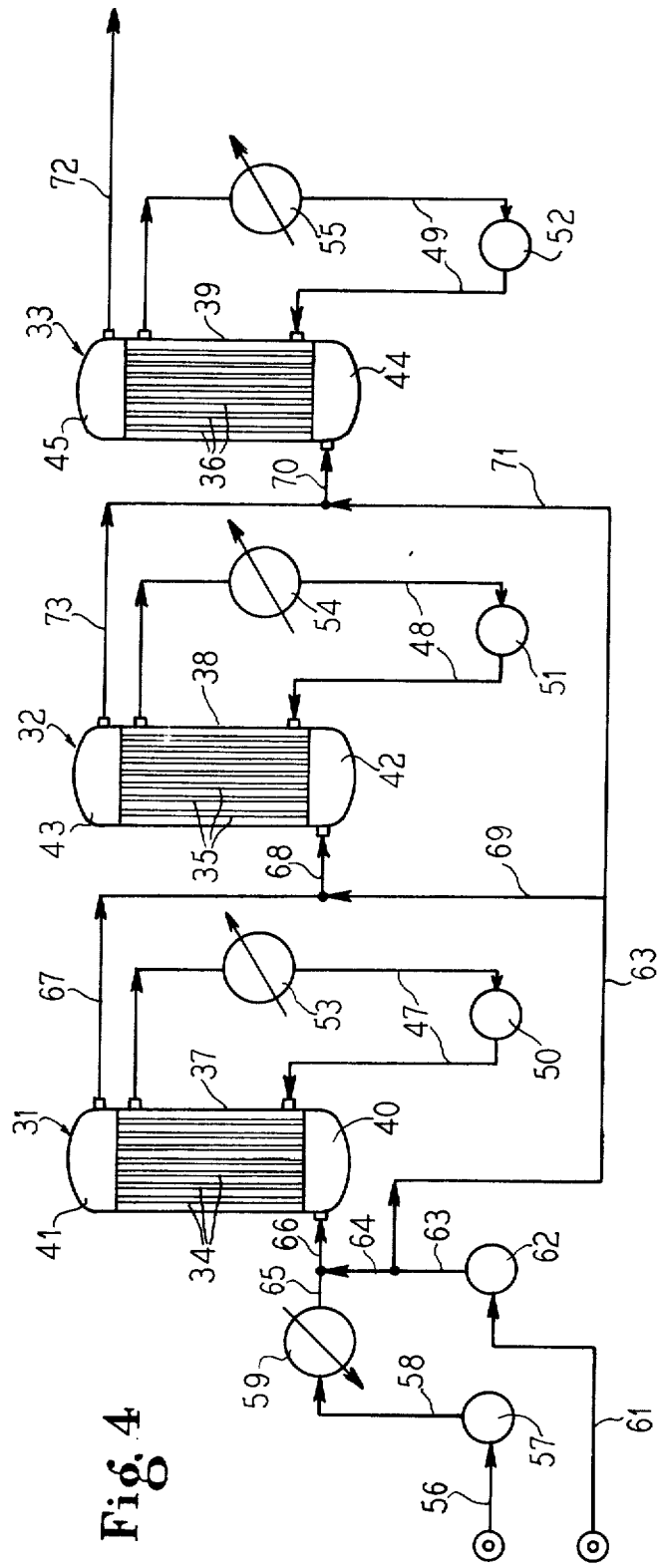
FIG. 4 is a diagrammatic process flow sheet illustrating an embodiment of the present invention.

Referring to the drawings, there is seen in FIG. 4 a process flow diagram of one embodiment of the present invention. Thus, the embodiment employs three shell and tube type reactors 31, 32 and 33, each of which is similarly constructed and similarly sized to the others thereof and each of which is adapted for maintenance of isothermal reaction conditions. Each reactor 31, 32 and 33 is equipped with a plurality of tubes 34, 35 and 36, respectively, conventionally disposed in spaced, parallel relationship with respect to each other within respective shells 37, 38 and 39. Opposite ends of each set of tubes 34, 35 and 36 interconnect with a header or chamber 40, and 41, 42 and 43, and 44 and 45, respectively. Cooling fluid, such as water or the like, is circulated within shells 37, 38 and 39 by means of conduits 47, 48 and 49, respectively, and cooling pumps 50, 51 and 52, respectively, with the cooling fluid being cooled to a predetermined temperature by means of coolers 53, 54 and 55, respectively, whereby the tubes 34, 35 and 36 are maintained at substantially isothermal, constant, preset temperature during operation of reactors 31, 32 and 33, as those skilled in the art will appreciate. Each of the tubes 34, 35 and 36 is charged with granules of preferably a Raney copper catalyst (not shown) having, in each instance, an initial catalytic activity as indicated hereinabove.

In operation, water from line 56 is pumped by a pump 57 through a conduit 58, preferably in a deionized, deaerated condition, through a variable steam preheater 59 wherein the water is preheated to a predetermined temperature. Acrylonitrile is pumped from line 61 by a pump 62 through a conduit 63. A branch 64 of conduit 63 interconnects with a heated water conduit 65 after which the combined mixture is fed through a conduit 66 into the chamber 40 of reactor 31. The resulting mixture of reactant composition then passes through tubes 34 and into chamber 41, from which the resulting reactant composition is conveyed by a conduit 67 to a conduit 68 and then into chamber 42 of reactor 32.

Conduit 67 connects with a branch conduit 69 from conduit 63 and additional (fresh) acrylonitrile is mixed with the reactant composition from reactor 31 before the resulting mixture enters chamber 42 via conduit 68. The resulting reactant composition then passes through tubes 35 and into chamber 43 of reactor 32 from which the resulting reactant composition is conveyed by a conduit 73 to a conduit 70 and then into chamber 44 of reactor 33. Conduit 73 connects with a branch conduit 71 from conduit 63 and additional (fresh) acrylonitrile is mixed with the reactant composition from reactor 32 before the resulting mixture enters chamber 44 via conduit 70. The resulting reactant composition then passes through tubes 36 and into chamber 45 from which the resulting reactant composition is conveyed away by a conduit 72. By conduit 72, the resulting product reactant composition is conducted to storage or a subsequent processing station, such as a stripping zone, as indicated hereinabove, to produce a desired purified acrylamide in water solution.

The use of series reactors with sequential acrylonitrile addition has the advantage of permitting water to be used to absorb the heat of the hydrolysis reaction. Also, the catalyst beds in each reactor see uniform usage which tends to extend the overall useful life of a catalyst and also encourages long, continuous runs.

An additional advantage is obtained by rotating the reactor with catalyst charges so a newest, most active catalyst bed may be always in the last reactor being used in a series and the oldest, least active catalyst bed may be in the first reactor of such. The first part of the reaction is inherently fast, and a highly active catalyst is not required in the first stage. The last stage has the inherently slowest reaction rates which occur above the aforeindicated desired 60% conversion in a product stream, so the most active catalyst is best used in this stage.

To illustrate how this is accomplished, assume three reactors have been operating in order 1-2-3. Reactor 1 catalyst deactivates, so it is pulled out of the system and recharged. While reactor 1 is down, the remaining reactors operate in order 2-3. Reactor 1 is brought back into the system so operation is in order 2-3-1. With the passage of time reactor 2 deactivates and it is pulled out of the system. While reactor 2 is recharged the remaining reactors operate in order 3-1. Reactor 2 is brought back into the system so operation is in order 3-1-2. Subsequent cycles continue to follow.

Figure 5:
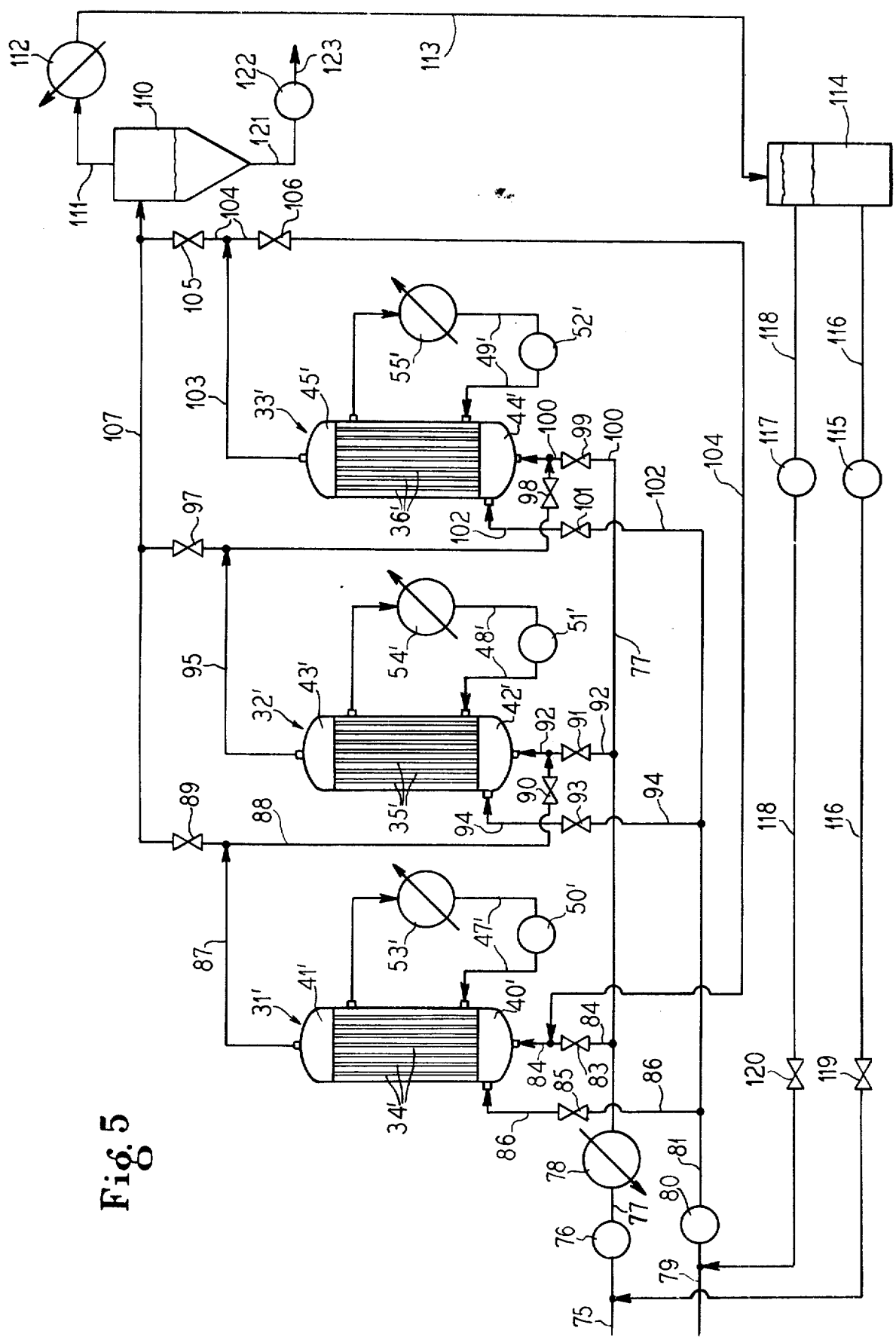
FIG. 5 is a view similar to FIG. 4 but showing a preferred embodiment.

In FIG. 5 is seen a process flow diagram for such a preferred embodiment of the present invention. Here again, three shell and tube type reactors are employed which can be similar to those employed in the FIG. 4 apparatus, and which are numbered similarly to such, but with the addition of primer marks thereto, including cooling pumps, coolers and associated conduits, and which have their respective tubes 34', 35' and 36' similarly packed preferably with Raney copper catalyst granules. Water is charged from a feed conduit 75 by pump 76 via conduit 77, preferably in a deionized, deaerated condition, through a variable steam preheater 78 wherein the water is preheated to a predetermined temperature. Acrylonitrile is charged from a feed conduit 79 by pump 80 through a conduit 81.

By opening valve 83 in conduit 84 water from preheater 78 is charged to header 40', and by opening valve 85 in conduit 86 acrylonitrile from line or conduit 81 is charged to header 40' wherein the water and the acrylonitrile mix and pass first into and through the tubes 34' of reactor 31' and then into header 41'. From header 41', reactant composition passes into conduit 87 and then into conduit 88, a valve 89 in conduit 88 being closed, and a valve 90 in conduit 88 being open so that such reactant composition passes through conduit 92 into header 42' of reactor 32'. Valve 91 in line 92 is closed, so no fresh water passes into header 42'.

However, valve 93 in line 94 is opened, so fresh acrylonitrile passes from conduit 81 with which line 94 connects into the header 42' of reactor 32'. In header 42', the reactant composition and the acrylonitrile mix and first pass into and through the tubes 35' of reactor 32' and then into the header 43' thereof. From header 43' reactant composition passes into conduit 95 and then into conduit 96, a valve 97 in conduit 96 being closed, and a valve 98 in conduit 96 being open so that such reactant composition passes through conduit 100 into header 44' of reactor 33'. Valve 99 in line 100 is closed, so no fresh water passes into header 44'.

However, valve 101 in line 102 is opened, so fresh acrylonitrile passes from conduit 81 with which line 102 connects into the header 44' of reactor 33'. In header 44', the reactant composition and the acrylonitrile mix and first pass into and through the tubes 36' of reactor 33' and then into the header 45' thereof. From header 45', reactant composition passes into conduit 103 and then into conduit 104, a valve 105 in conduit 104 being open and a valve 106 in conduit 104 being closed so that reactant composition flows through conduit 104 into conduit 107 from conduit 103 and then into a flash tank 110. In place of flash tank 110, one can employ any convenient distillation, stripping, or evaporation apparatus, or some combination thereof, as those skilled in the art will appreciate. From flash tank 110 vaporized water and acrylonitrile pass through conduit 111 into condenser 112 and the condensate passes through line 112 into decantor 114 where the acrylonitrile phase is separated from the water phase. The water phase is pumped through pump 115 via conduit 116 back to interconnection with water input line 75 to complete recycle of the water phase while the acrylonitrile phase is pumped via pump 117 through line 118 back to interconnection with acrylonitrile input line 79 to complete recycle of the acrylonitrile phase. Amount of recycle of water phase and of acrylonitrile phase can be controlled by respective valves 119 and 120.

The acrylamide product solution leaves flas drum 110 via conduit 121 and is pumped by a pump 122 through conduit 123 to subsequent storage or a polymerization process, as is desired.

Alternatively, in operation, for another example, when it is desired to use reactor 32' as the first reactor, reactor 33' as the second reactor, and reactor 31' as the third reactor, valve 83 is closed and valve 91 is opened so that water and acrylonitrile flows through conduits 92 and 94, respectively, into header 42' and through the tubes 35' of reactor 32', into header 43, and out through output conduit 95 valve 97 being closed. From conduit 96, reactant composition flows through open valve 98 through conduit 100 into header 44, valve 99 being closed where such mixes with fresh acrylonitrile from line 102. The resulting mixture passes through tubes 36' of reactor 33', then into header 45' and out through conduit 103. From conduit 103, reactant composition flows into conduit 104, valve 105 being closed, and valve 106 being open, and hence into and through conduit 84 into header 40' of reactor 31'. In header 40', the reactant composition mixes with fresh acrylonitrile from line 86 and the resulting mixture passes through tubes 34', header 41' and then out through line 87. Valve 90 being closed, the composition flows into line 107, and into flash tank 56, wherein flashing occurs as described above.

In the same manner, any desired sequence of three reactors may be employed in the practice of this invention; thus, in addition to the above, the sequence 33', 32' 31' can be used in the illustrated embodiment of FIG. 4.

If in operation, one of the three reactors 31', 32' or 33' is to be removed from service for some purpose temporarily, the other such reactors can continue to operate. For example, if reactor 32' is bipassed, reactor 33' used as the first reactor and reactor 31' used as the second reactor, one closes valves 83 and 91 so that water flows from conduit 77 into input conduit 100 past open valve 99 into header 44' of reactor 33'. Valve 93 is closed. The mixture of water and acrylonitrile passes through tubes 36' into header 45' and out through line 103, from which the reactant composition enters line 104, valve 106 being open and valve 105 being closed. Reactant composition thus is returned to header 40' throughline 104 and through line 84 and is mixed with acrylonitrile from line 86 (valve 85 being open normally).

The resulting reactant composition moves through tubes 34' into header 41' and out conduit 87, with valve 90 closed and valve 89 open, reactant composition moves through conduit 107 (valve 97 being closed) and hence into flash tank 56 wherein flashing occurs as described above. Similarly, any sequence of two reactors of such a three reactor series, may be employed in the practice of this invention; thus, for examples, in addition to the above, the sequences 31' and 32', and 33' and 32', can be employed in the embodiment illustrated in FIG. 5.

In reactors 31, 32 and 33 or in reactors 31', 32' and 33' any convenient combination of tube inside diameter and tube length which will satisfy the above indicated process parameters may be employed, though, for reasons of process convenience, each reactor in a series of three is equipped with tubes of dimensions substantially equal to those used in the other reactors of such series, stainless steel being a convenient construction material. Each reactor can be a single tube or a multiplity of tubes. In one preferred form of process as shown in FIG. 5, for example, the tubes can have a length of from about 4 to 20 feet, are circular in cross section, and have a diameter of from about ¼ to 4 inches (preferably 1 to 2 inches). Reactor spatial orientation is not important, but is preferably vertical.

In such a three reactor sequence, the pressure employed is sufficient to maintain liquid phase conditions in all reaction zones.

The tubular reaction zones are preferably mounted vertically and are oriented parallelly to one another. The tubes are placed inside a common vessel or shell through which a coolant is circulable to remove the heat generated by the hydrolysis reaction proceeding therein in operation of the process of this invention.

Coolant fluid on the shell side of each reactor is preferably circulating water which absorbs the heat of reaction by increasing its temperature as it flows through the shell. Preferably the temperature increases by about 5° to 10°F in circulating through the shell, though such increase can range from about 1 to 30°F, or even more, as desired.

More generally, the fluid can be a hydrocarbon liquid, such as one selected from among thermal fluids marketed under various trade names, such as Dowtherm R (by the Dow Chemical Co.), or any mineral oil with a normal boiling point above about 200°F and a pour point below about 70°F.

Alternately, the heat of reaction can be removed by a boiling fluid on the shell side, where the boiling fluid is at constant temperature and the heat of reaction is removed by the latent heat of vaporization of the liquid. The liquid should preferably have a normal boiling point in the range of from about 90° to 150°F, more broadly from about 50° to 220°F. A suitable liquid here would be a fluorocarbon refrigerant sold under the name Freon 113 R by the DuPont Company which has a normal boiling point of 117.6°F., or the like.

Consequently, a three rotating reactor sequence not only allows a high degree of flexibility but also tends to maximize useful catalyst life. One feature of this three reactor sequence is that the temperatures of the respective stages are increasable as the catalyst deactivates so that conversion can be held at a desired constant level. Catalyst life would end when conversion can not be held up without going to excessively high temperatures that would or could cause side reactions.

The following Table 1 summarizes process variables for such a three reactor sequence under continuous steady operation:

TABLE I

| Reaction Zone | Variables | About Broad Range | About Preferred Range |
|---|---|---|---|
| 1. | conversion of acrylonitrile to acrylamide based on reactor 1 feed [1] (%) | 60–99 | 70–90 |
| | fraction of total acrylonitrile fed to first stage (%) | 17–50 | 25–42 |
| | weight hourly space velocity | 0.3–30 | .75–6 |
| | temperature (°F) | 100–300 | 150–260 |
| 2. | cumulative conversion of acrylonitrile to acrylamide based on acrylonitrile to reactor 1 and reactor 2 [2] (%) | 60–99 | 70–90 |
| | fraction of total acrylonitrile fed to second stage (%) | 17–50 | 25–42 |
| | weight hourly space velocity | 0.3–30 | .75–6 |
| | temperature (°F) | 100–300 | 150–260 |
| 3. | cumulative conversion of acrylonitrile to acrylamide based on acrylonitrile fed to all three reactors [3] (%) | 60–99 | 70–90 |
| | fraction of total acrylonitrile fed to third stage (%) | 17–50 | 25–42 |
| | weight hourly space velocity | 0.3–30 | .75–6 |
| | temperature (°F) | 100–300 | 150–260 |

[1] all of the water plus the acrylonitrile as defined above.
[2] Stage 1 product plus additional acrylonitrile as defined above.
[3] Stage 2 product plus additional acrylonitrile as defined above.

In the three reactor sequence, when one desires to operate with one reactor out of operation (for whatever reason) with other reactors remaining in series, there are four possible modes of operation which can be employed in operating immediately prior to pulling such one reactor out of the system, as follows:

a. The two remaining stages can be run at the same conditions that existed in the first two stages immediately prior to pulling out one reactor. The consequence is reduced conversion at the same overall flow rate.

b. Same as a, except that the system flow rate is reduced to partially or totally restore the conversion level lost by pulling out a reactor.

c. Same as a except that temperature is increased in one or both stages to partially or totally restore the conversion level lost by pulling out a reactor.

d. Combination of b and c.

The following Table II summarizes process variables for such a two reactor sequence under continuous steady start operation using the same feed composition and reactor sequence covered in Table I:

Table II

| Reaction Zone | Variables | About Broad Range | About Preferred Range |
|---|---|---|---|
| 1 | conversion of acrylonitrile to acrylamide based on reactor 1 feed (%) | 60–99 | 70–90 |
| | fraction of total acrylonitrile fed to first stage (%) | 25–75 | 37.5–62.5 |
| | weight hourly space velocity | .3–30 | .75–6 |
| | temperature (°F) | 100–300 | 150–260 |
| 2 | cumulative conversion of acrylamide based on total acrylonitrile feed (%) | 60–99 | 70–90 |
| | fraction of total acrylonitrile fed to second stage (%) | 25–75 | 37.5–62.5 |
| | weight hourly space velocity | .3–30 | .75–6 |
| | temperature (°F) | 100–300 | 150–260 |

Preferably in the practice of this invention it is preferred to employ catalysts whose activity is stable for a period of time sufficiently long to permit rather extended commercial continuous runs of hydrolysis according to this invention without catalyst deactivation. For example, it is preferred to use a catalyst which retains at least about 75% of its initial activity (as determined by the procedure of Example 1 below) for a period of at least about 500 hours when used in a reaction zone of a process embodiment of this invention, there being no necessity to raise the (normally constant, prechosen) reaction zone temperature.

Referring to FIG. 1, curve A is an idealized composite of various test runs and shows generally the characteristic relationship between contact time (in terms of the reciprocal of weight hourly space velocity, (the units on the abscissa being computed hours) versus the total percent conversion of acrylonitrile to acrylamide for a system using a catalyst with an activity of about 1 and where a single stage reaction zone is maintained at about 200°F and hydrolysis is carried to the point of about 80% conversion of starting acrylonitrile to acrylamide. At conversion rates higher than about 90%, the reaction rates is typically so slow as to make higher conversions economically and practically unattractive from the standpoint of a highly efficient continuous process operation.

The composite curve formed by individual curves $B_1$, $B_2$ and $B_3$ illustrates a three reaction zone process of the present invention also using a catalyst with an activity of about 1 and wherein the first reaction zone is operated at about 170°F, the second reaction zone is operated at about 190°F, and the third reaction zone is operated at about 215°F. For comparative purposes, the reciprocal weight hourly space velocity as shown in FIG. 1 for the three reaction zone case (curves B) is calculated on the basis of total feed rate to all three reactors. In this illustration, there are inherently slight variations in respective total reactant feed rates to each of these three reactors, as those skilled in the art will appreciate. Line C marks the end of zone 1 and the beginning of zone 2, and line E marks the end of zone 2 and the beginning of zone 3. Line D is a reference straight line connecting the 0 and 80% conversion points. An incremental conversion of acrylonitrile to acrylamide, based on total feed, of about 26.7% is achieved in each stage. In the first zone, there is thus achieved a conversion of about 26.7% at a reciprocal weight hourly space velocity of about 0.33 hours. At the same reciprocal weight hourly space velocity value in the single reaction zone a conversion of over 50% of acrylonitrile to acrylamide occurs (see the dotted line C in FIG. 1). Similarly, at the end of zone 2 a total conversion of about 53⅓% (see dotted line E) is achieved in contrast to that achieved in a single reaction zone (see curve A) where a total conversion of about 72% is achieved. A total of 80% conversion is achieved for both systems.

Figure 2:
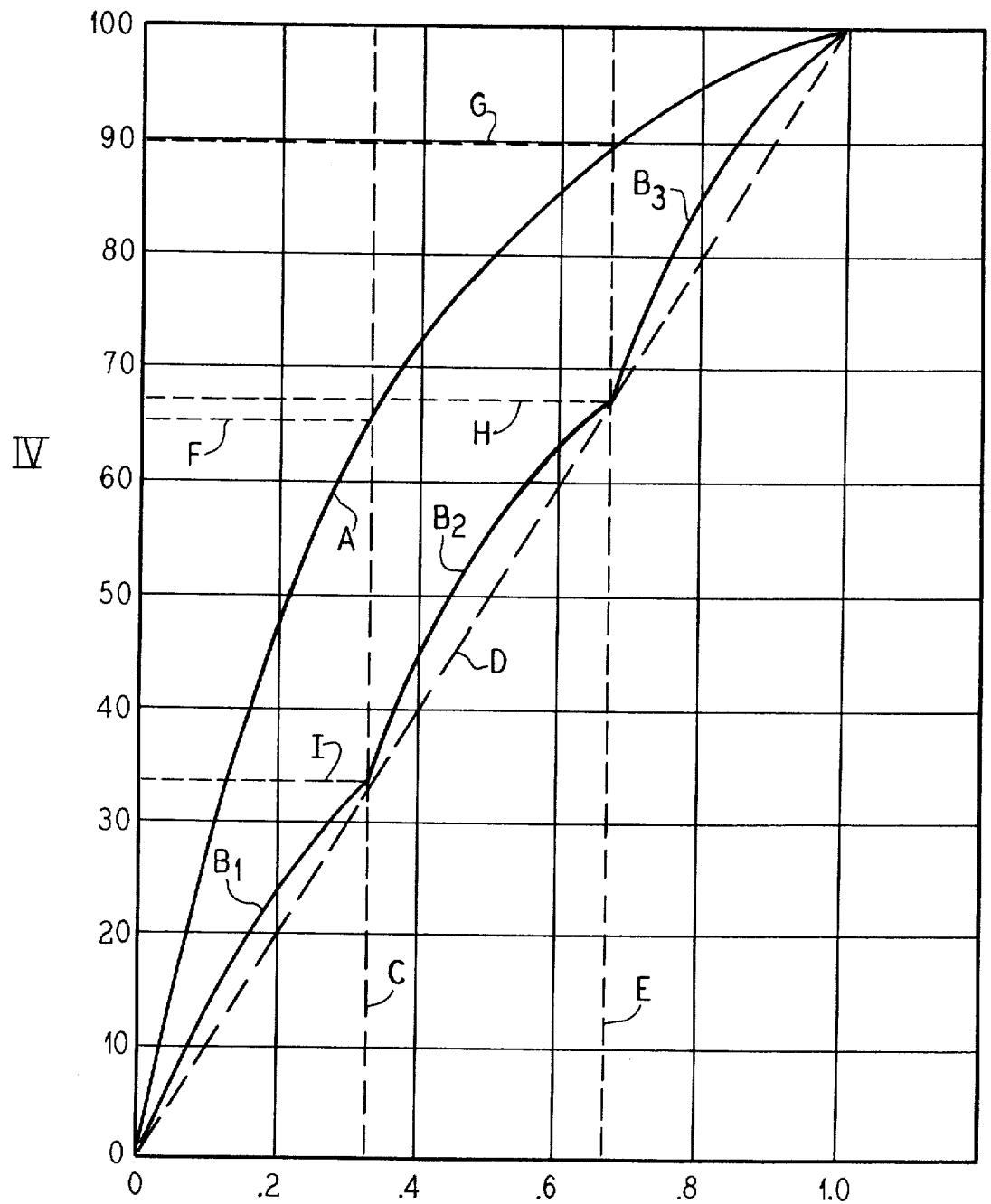
FIG. 2 shows plots illustrating cumulative heat evolved as ordinate IV relative to varying contact times in hours (shown as the reciprocal of weight hourly space velocity) as abscissa III for the embodiment shown in FIG. 1.

FIG. 2 illustrates the dependence of cumulative heat evolution on contact time in the preferred three zone case, and also in an idealized single zone case. Curve A in FIG. 2 illustrates the single zone case, and composite curve $B_1$, $B_2$, $B_3$ illustrates the preferred three zone case. The contact time for the three reaction zone case is determined by the same method as in FIG. 1. This Figure 2 is directly obtained from FIG. 1 by applying the relationship:

Heat evolved (Btu/hr) equals heat of reaction ($^{Btu}$/lbs. AN) times feed rate of acrylonitrile (lbs AN/hr) times fractional conversion of acrylonitrile to acrylamide. (An designates acrylonitrile).

FIG. 2 shows that, for the single zone case, 65% of the total heat evolution occurs in the first equal segment of the zone (see lines C and F). 90 minus 65 equals 25% of the total heat evolution occurs in the second equal segment of the zone (see lines E and G) and 100 minus 90 equals 10% of the total heat evolution occurs in the third equal segment of the zone. In contrast, the three zone case shows 33⅓% of the total heat evolution occurring in each of the three equal sized contact zones (see lines H and I and also average line D).

The imbalance of heat evolution between equal segments of the one zone case is directly responsible for temperature control difficulties which are experienced in conducting the reaction in this manner. Heat is removed from the reaction zone to the cooling medium which surrounds the reaction zone by conduction and connection through the reaction zone to the wall of the vessel which surrounds the reaction zone, conduction through the wall of the vessel, and conduction and connection to the bulk of the cooling medium. As a first order approximation, it is widely known that the rate of heat transfer will be proportional to the temperature difference between the reaction zone and the cooling medium. Since the cooling medium is operated in a manner which for present illustrative discussion purposes may be regarded as being nearly isothermal, the temperature inside of the reaction zone will adjust itself to a value which results in the heat generated being transported to the cooling medium. If a high quantity of heat is evolved, in any segment of a reaction zone, the temperature of this segment must rise to a high temperature relative to the cooling medium. Conversely, a low quantity of heat is evolved in any segment of a reaction zone, the temperature of the segment will closely approach the temperature of the cooling medium. For the single zone example of FIG. 2 (see curve A), the heat evolved in segment 1 (before line C) in 65 divided by 10, or 6.5 times as great as the heat evolved in segment 3 (after line E). Hence, as an approximation, the temperature difference between segment 1 and the cooling medium must be 6.5 times as great as the temperature difference between segment 3 and the cooling medium, resulting in higher temperatures in the first segment than the third segment. By this invention, acrylonitrile feed rate (as opposed, for example, to temperature regulation) is utilized to equalize heat evolution between successive reaction zones.

The following Table III summarizes the degree of imbalance which occurs between the three zones:

Table III

| Contact Time | PERCENT OF TOTAL HEAT EVOLVED | | Ratio of heat evolved in single zone case compared to 3 zone case. |
|---|---|---|---|
| | Single Zone | Three Zone | |
| First third | 65 | 33⅓ | 1.95 |
| Second third | 25 | 33⅓ | .75 |
| Last third | 10 | 33⅓ | .30 |
| Total | 100 | 100 | |

A further characteristic of the reaction is that the rate of conversion is increased by higher temperatures, which will cause higher rates of conversion and heat evolution than even the prior point suggests in the first segment of the single zone case. Hence, the present invention provides a highly advantageous process.

The present invention provides a process which is surprisingly efficient as respects amount of energy consumed in relation to product acrylamide produced, particularly in relation to such factors as conversion rate, total conversion, and concentration of acrylamide in product aqueous solution.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification and drawings.

EXAMPLE 1

A reactor is formed of a double pipe heat exchanger design. The inner tube, which constitutes the reaction zone, is a 5 foot length of 304 S.S., schedule 10S pipe which has an inside diameter of 1.097 inch and an outside diameter of 1.185 inch. This pipe is vertically positioned and equipped to allow introducing the feed at the bottom and withdrawing product from the top. The inner tube is uniformly surrounded by a jacket which is provided with an inlet at the bottom of the jacket and an outlet at the top of the jacket to allow circulating an oil for removing the heat of reaction.

A thermowell of about ⅛ inch diameter is inserted from the top and runs the length of the inner pipe to allow temperature measurements to be made throughout the reaction zone.

When this reaction is used to determine activity of a catalyst, during operation of this reactor, acrylonitrile and water are separatedly pumped from volumetrically calibrated feed tanks, combined, heated, and introduced into the bottom of the reactor. The reactor is maintained under pressure as necessary to allow maintaining liquid phase conditions. Product leaving the reactor is cooled before reducing pressure to atmospheric. Product is collected in a final receiver.

The feed tanks are sparged with nitrogen for a brief time before the beginning of a run to minimize oxygen contained in the feeds to the reactor.

Samples of product are analyzed for weight % acrylamide, weight % acrylonitrile, and weight % water to determine conversion levels (100 weight percent total product weight basis).

The procedure to determine catalyst activity is as follows: A measured weight of catalyst is charged to a tubular reactor so as to occupy approximately 50 cubic inches and a series of tests are run as previously described. The tests are run at different contact times with all other variables held constant, as follows:

1. Arithmetic mean catalyst bed temperature of 210°F.

2. Feed composition 100 weight % basis of 35 weight % acrylonitrile and 65 weight % water.

Contact time is inversely measured as weight hourly space velocity (WHSV), which is defined as weight hourly feed rate divided by catalyst weight in the reaction zone.

The contact times are varied to bracket an 80% conversion level. The WHSV required for 80% conversion ($WHSV_{80}$) is estimated by graphical or statistical interpolation. The catalyst activity (a) is then calculated from the following expression:

$$a = 0.6 \ (WHSV_{80})$$

The ranges for catalyst activity are elsewhere herein indicated. All catalyst activity values in this application are measured by the procedure described in this Example.

WHSV's in the range of 0.4 to 6.0 are useful starting points to bracket the space velocity required for 80% conversion ($WHSV_{80}$), the last being an abbreviation for weight hourly space velocity needed for 80% conversion.

EXAMPLE 2

Example demonstrating the production of a catalyst suitable for hydration of acrylonitrile to acrylamide by the process of the present invention.

Small ingots of a 50% copper, 50% aluminum alloy are crushed using a roll crusher and screened to obtain a 6 to 8 mesh particle size cut from the crushings. These 6 to 8 mesh alloy particles are then activated with caustic to form a granular Raney copper catalyst by the following procedure:

A reaction vessel of approximately 30 gal which is equipped with a cooling jacket and an agitator is charged with about 6.5 lbs of the 6–8 mesh alloy particles, 67 lbs of deionized water and about 0.08 lbs of dissolved gluconic acid and the vessle is maintained at about 85°F. Caustic in the form of an aqueous solution of 50 wt. % NaOH is then added to the mixture in the vessel continuously with stirring over a 5 hour period so that a total of 26.5 lbs. of 50% caustic is thus added to the vessel at the temperature indicated. After such caustic addition is completed, the vessel is maintained with stirring for an additional 5 hours. During the entire period of activation the temperature of the liquid in the vessel is maintained by adjusting the rate of coolant to the vessel jacket.

The product Raney copper granules thus produced are washed until wash water shows a neutral pH. These product washed granules are screened to remove fines smaller than 20 mesh and then stored under deionized water.

When evaluated for catalytic hydrolysis activity in the manner described in Example 1, this material is found to have an activity of about 1.0.

EXAMPLE 3

Example demonstrating the production of a catalyst suitable for hydration of acrylonitrile to acrylamide by the process of the present invention.

Small ingots of a 50% copper, 50% aluminum alloy are crushed using a roll crusher and screened to obtain a 6 to 8 mesh particle size cut from the crushings. These 6 to 8 mesh alloy particles are then activated with caustic to form a granular Raney copper catalyst by the following procedure:

A reaction vessel of approximately 30 gal. which is equipped with a cooling jacket and an agitator is charged with about 15 pounds of a 25 weight percent solution of NaOH. About 0.04 pounds of gluconic acid are dissolved in such solution. The product solution is maintained at about 70°F and a total of about 3 pounds of the alloy particles above prepared are added to this solution over a time of about 1.5 hours with agitation. Thereafter, agitation of the resulting system is continued for an additional time of about 2.5 hours. The mole ratio of NaOH to aluminum is estimated to be about 1.69. The system temperature during this entire procedure is maintained in the range from about 68 to 81°F.

The product Raney copper granules thus produced are washed until wash water shows a neutral pH. These product washed granules are screened to remove fines smaller than 20 mesh and then stored under deionized water.

When evaluated for catalytic hydrolysis activity in the manner described in Example 1, this material is found to have an activity of about 0.3.

EXAMPLE 4

Example illustrating use of a dilute acrylonitrile solution as feed to a single reactor.

The reactor is as described in Example 1. The catalyst similar to that of Example 2. Variables and results are summarized in Table VIII below:

| | |
|---|---|
| Catalyst activity | 0.7 |
| Weight of Catalyst charge | 960 grams |
| WHSV | 4.9 |
| Feed composition % | |
| acrylonitrile | 9 |
| water | 91 |
| Average bed temperature °F | 205 |
| Conversion ACN to AM (%) | 80 |
| Concentration of AM in Product (%) | 10 |

The results show that it is possible to closely control reaction temperature; however, the acrylamide concentration in the product is only about 10% which is unacceptable for present purposes.

EXAMPLE 5

Example demonstrating surprisingly fast rate of conversion between 0 and 30% conversion relative to the conversion rate above 60% conversion.

The reactor used is as described in Example 1, and the catalyst used similar to that described in Example 2 above and has an initial activity of about 1.0. About 1059 grams of such catalyst are charged to the reactor.

The following runs are conducted at different catalyst contact times with all other variables being held essentially constant.

| Test | Temperature (°F) | Contact Time, or 1/WHSV | % Acrylonitrile in feed | % Conversion to amide |
|---|---|---|---|---|
| A | 192 | .62 | 34.2 | 65.0 |
| B | 190 | 1.27 | 34.3 | 81.6 |
| C | 189 | .155 | 34.3 | 30.9 |

The data show that, between 0 and 30% conversion, the rate of conversion proceeds at an average rate of about 200%/hr, while, between 65 and 80% conversion, the rate of conversion is substantially reduced to an average of only about 25%/hr.

EXAMPLE 6

The hydration of acrylonitrile to acrylamide is accomplished in a sequential three identical reactor configuration. Each reactor is of shell and tube design, and has multiple tubes which are each 1-½ inches in diameter and 8 feet long. The tubes of each reactor are oriented parallel to each other and are spaced from one another on a 1-¾ inch triangular pitch pattern. The tubes of each reactor are placed inside a common shell which is equipped with inlet and outlet nozzles for circulation of water to allow removing the heat of reaction. The bottoms of the tubes mounted in each reactor shell are open to a common bottom chamber into which the reactants are introduced to each stage. The tops of the tubes mounted in each reactor are open to a common top chamber from which the product is withdrawn from each reactor. The reactors are mounted in a position which aligns the axes of the parallel tubes in a substantially vertical position.

The bottom chamber of the reactors is filled with ½ inch inert alumina balls which serve as a support for the catalyst. A Raney copper catalyst of the type produced in Example 2 above and having an activity of about 1.0 is packed inside the tubes of each reactor, filling them from top to bottom.

Each reactor is equipped with a cooler and a circulation pump which are interconnected in a manner which allows circulating water through each reactor shell, as illustrated in FIG. 5. Controls are provided to allow closely controlling the circulating water temperature.

The reactor system is also equipped with two separate pumps one each for feeding acrylonitrile and water to the first reactor. A preheater is also provided to preheat the fresh water reactant feed to a designated level.

Acrylonitrile and water are pumped by their respective feed pumps at rates which give a system WHSV of about 1.0 and a calculated weight ratio of acrylonitrile to water of about 0.54. All of the water and approximately ⅓ of the total acrylonitrile used are fed to the first reactor. The effluent of the first reactor and approximately ⅓ of the total acrylonitrile used are fed to the second reactor. Similarly, the effluent from the second reactor and the remaining ⅓ of the total acrylonitrile used are fed to the third reactor.

Water is circulated in the shell of each of the reactors. The temperature of the water circulating through each reactor shell is individually adjusted to obtain and maintain the desired temperature in the catalyst bed of each reactor. In this manner, adjustments are made to obtain an average temperature in the catalyst bed of the first reactor of about 190°F, an average temperature in the catalyst bed of the second reactor of about 210°F, and an average temperature in the catalyst bed of the third reactor of 215°F. The water preheater is adjusted to give a fresh water feed temperature of about 190°F.

The entire reactor system is maintained under 100 PSIG to maintain liquid phase conditions.

After reaching steady state conditions, the cumulative conversions of acrylonitrile to acrylamide is about 27% in reactor 1 product, about 53% in reactor 2 product, and about 80% in the final product from the third reactor, based on total acrylonitrile fed to the reactors.

The final product from the third reactor is approximately 38% acrylamide, 7% acrylonitrile, and 55% water. No impurities are detected at levels equal to, or greater than, 0.1%.

EXAMPLE 7

The hydration of acrylonitrile to acrylamide is accomplished in the three reactor configuration of Example 6. A Raney copper catalyst similar to that of Example 3 is used to fill the tubes of the three reactors. The catalyst as indicated has an activity of approximately 0.3.

Acrylonitrile and water are pumped by their respective feed pumps at rates which give a system WHSV of about 1.0 and a calculated weight ratio of acrylonitrile to water of about 0.54. All of the water and approximately ⅓ of the total acrylonitrile used are fed to the first reactor. The effluent of the first reactor and approximately ⅓ of the total acrylonitrile used are fed to the second reactor. Similarly, the effluent from the second reactor and the remaining ⅓ of the total acrylonitrile used are fed to the third reactor.

Water is circulated in the shell of each of the reactors. The temperature of the water circulating through each reactor shell is individually adjusted to obtain and maintain the desired temperature in the catalyst bed of each reactor. In this manner, adjustments are made to obtain an average temperature in the catalyst bed of the first reactor of 220°F, an average temperature in the catalyst bed of the second reactor of 240°F, and an average temperature in the catalyst bed of the third reactor of 250°F. The water preheater is adjusted to give a fresh water feed temperature of about 220°F.

The entire reactor system is maintained under 100 PSIG to maintain liquid phase conditions.

After reaching steady state conditions, the cumulative conversion of acrylonitrile to acrylamide is about 27% in reactor 1 product, about 54% in reactor 2 product, and about 80% in the final product from the third reactor, based on total acrylonitrile fed to the reactors.

The final product from the third reactor is approximately 38% acrylamide, 7% acrylonitrile and 55% water. No impurities are detected at levels equal to, or greater than, 0.1%.

EXAMPLE 8

In the course of operating the process of Example 6, reactor 1 is removed from operation for maintenance. Reactors 2 and 3 continue operation under modified conditions at a reduced efficiency. The same catalyst of Example 6, having an activity of about 1.0, remains in use in reactors 2 and 3.

Water is fed to reactor 2 at approximately ⅔ of the rate used in Example 6. Acrylonitrile is fed to reactors 2 and 3 at approximately the same rate at which acrylonitrile is fed to these reactors in Example 6. The effluent from reactor 2, in combination with such additional acrylonitrile, is the feed to reactor 3.

The circulating water temperature of reactor 2 is lowered to achieve an average catalyst bed temperature in reactor 2 of about 195°F. Similar adjustment is made in reactor 3 to achieve an average bed temperature thereof about 210°F. The water preheater is adjusted to give a fresh feed water inlet temperature to reactor 2 of about 195°F.

The entire reactor system is maintained under about 100 PSIG to maintain liquid phase conditions.

After reaching steady state conditions, the cumulative conversion of acrylonitrile to acrylamide is about 40% in the reactor 2 product effluent and about 80% in the reactor 3 product effluent, both based on total acrylonitrile fed to the system.

The final product from the third reactor is approximately 38% acrylamide, 7% acrylonitrile, and 55% water. No impurities are detected at levels equal to, or greater than, about 1%.

EXAMPLE 9

Example illustrating use of stripping to concentrate a reaction product and remove unconverted acrylonitrile.

A continuous stripping unit is constructed by fitting a 10 liter resin flask with an electric heating mantel, an agitator, temperature indicator, vacuum gauge, and vacuum pump. Provisions are made for continuously introducing feed and withdrawing product. The vapors are directed through a Vigreaux column above the flask and externally condensed.

A product similar in composition to that of Example 6 and having the following analysis is stripped in this unit:

| Component | wt% (100 wt % basis) |
|---|---|
| water | 57.0 |
| acrylonitrile | 8.7 |
| acrylamide | 34.3 |

The feed is continuously fed to the unit, and the rate of heat to the unit is adjusted to strip off a desired quantity of acrylonitrile and water.

The resin flask is run approximately half full of liquid while stripping. The temperature of the liquid in the flask is maintained at 68°–70°C during operation of the unit by maintaining a vacuum of 21.5 in. of Hg.

The overheads split into two phases after condensing. Between 350 and 430 cc/hr of water-rich phase and 130–200 cc/hr of nitrilerich phase are collected. The composite product sample is analyzed and found to have the following composition:

| Component | wt% (100 wt % basis) |
|---|---|
| water | 54.3 |
| acrylonitrile | .4 |
| acrylamide | 45.2 |

Less than about 0.1 weight percent by-products or impurities are detected in the acrylamide solution by vapor phase chromatography.

The product from this run and other similar runs is successfully employed in making high quality acrylamide polymers and copolymers of acrylamide and sodium acrylate.

I claim:

1. A continuous process for catalytically hydrolyzing acrylonitrile to acrylamide comprising the steps of
   A. continuously moving water under liquid phase conditions through at least one elongated substantially plug flow reaction zone,
   B. adding to the liquid in said zone or zones at no less than two locations along said zone or zones acrylonitrile, there being at least one such addition location immediately before or within each of said zones if more than one zone is present, the rate of such addition being such that the total weight percent of water in said liquid in said zone or zones declines from a maximum to a minimum between the first and the last of such locations after mixing, the calculated weight ratio of total acrylonitrile charged to total water charged ranging from about 1:3 to 3:1,
each one of said reaction zones
   a. containing a fixed catalyst bed,
   b. the catalyst comprising each of said beds being characterized by having an initial activity of at least about 0.25 based upon a starting feed composition of 35 wt. % acrylonitrile and 65 wt. % water, total composition basis, using an arithmetic mean catalyst bed temperature of 210°F., a catalyst bed volume of about 50 cubic inches and an evaluation weight hourly space velocity which is sufficient to produce 80% conversion of acrylonitrile to acrylamide,
said process
   a'. being conducted substantially isothermally at individual reaction zone temperatures each being in the range of from about 100° to 300°F.,
   b'. having a system weight hourly space velocity in the range of from about 0.1 to 10 hours $^{-1}$.

2. The process of claim 1 wherein there are three of said reaction zones and wherein the quantity of acrylonitrile so added at each location ranges from about 0.5 to 1.5 times the total quantity of acrylonitrile charged to all such locations divided by the total number of such locations.

3. The process of claim 1 wherein there are four of said reaction zones and wherein the quantity of acrylonitrile so added at each location ranges from about 0.5 to 1.5 times the total quantity of acrylonitrile charged to all such locations divided by the total number of such locations.

4. The process of claim 1 wherein said catalyst is in the form of particles ranging in size from about 0.01 to 0.49 inch.

5. The process of claim 1 wherein said catalyst is in the form of particles ranging in size from about 0.02 to 0.3 inch.

6. The process of claim 1 wherein said catalyst is a copper-containing catalyst.

7. The process of claim 6 wherein said catalyst is a Raney copper catalyst.

8. The process of claim 1 wherein said catalyst has such an initial activity of from about 0.25 to 2.

9. The process of claim 1 wherein said catalyst has such an initial activity of from about 0.45 to 1.5.

10. The process of claim 1 wherein said system weight hourly space velocity ranges from about 0.5 to 2.

11. The process of claim 1 wherein said zone temperatures range from about 150° to 260°F, wherein each of said reaction zones is maintained at a substantially constant temperature, and wherein each successive reaction zone is maintained at a higher temperature than the preceding reaction zone.

12. The process of claim 2 wherein said total system conversion is at least about 70%.

13. A continuous process for catalytically hydrolyzing acrylonitrile to acrylamide under substantially liquid phase conditions comprising
continuously and sequentially moving water through least two tubular reaction zones,
charging at least once to each such zone and the liquid therein acrylonitrile, the quantity of acrylon so charged to each such zone ranging from about 0.5 to 1.5 times the total quantity of acrylonitrile charged to all such zones divided by the total number of locations at which acrylonitrile is charged, the calculated wieght ratio of total acrylonitrile charged to total water charged ranging from about 1:3 to 3:1,
each one of said reaction zones
   a. containing a fixed catalyst bed,
   b. the catalyst comprising each of said beds being characterized by having an initial activity of at least about 0.25 based upon a starting feed composition of 35 wt. % acrylonitrile and 65 wt. % water, total composition basis, using an arithmetic mean catalyst bed temperature of 210°F., a catalys bed volume of about 50 cubic inches and an evaluation weight hourly space velocity which is sufficient to produce 80% conversion of acrylonitrile to acrylamide,
said process
   (a') being conducted substantially isothermally at individual reaction zone temperatures each being in the range of from about 100° to 300 °F,
   b' having a system weight hourly space velocity in the range of from about 0.1 to 10 hours $^{-1}$.

14. The process of claim 13 wherein there are two of said reaction zones.

15. The process of claim 13 wherein there are three of said reaction zones.

16. The process of claim 13 wherein there are four of said reaction zones.

17. The process of claim 13 wherein said catalyst is in the form of particles ranging in size from about 0.01 to 0.49 inch.

18. The process of claim 13 wherein said catalyst is in the form of particles ranging in size from about 0.02 to 0.3 inch.

19. The process of claim 13 wherein said catalyst is a copper-containing catalyst.

20. The process of claim 19 wherein said catalyst in a Raney copper catalyst.

21. The process of claim 13 wherein said catalyst has such an initial activity of from about 0.25 to 2.

22. The process of claim 13 wherein said catalyst has such an initial activity of from about 0.45 to 1.5.

23. The process of claim 13 wherein said system weight hourly space velocity ranges from about 0.5 to 2.

24. The process of claim 13 wherein said zone temperature range from about 150° to 260°F, wherein each of said reaction zones is maintained at a substantially constant temperature, and wherein each successive reaction zone is maintained at a higher temperature than the preceding reaction zone.

25. The process of claim 13 wherein said total system conversion is at least about 70%.

26. The process of claim 13 wherein the product liquid mixture is subjected to stripping to recover therefrom unreacted acrylonitrile.

27. The process of claim 26 wherein said recovered acrylonitrile is recycled back to at least one of said reaction zones.

28. The process of claim 26 wherein said recovered acrylonitrile is recycled back to the first of said reaction zones.

29. The process of claim 26 wherein said stripping is carried out at temperatures ranging from about 100° to 212°F. at pressures ranging from about 50 to 760 mm Hg.

30. The process of claim 26 wherein the so stripped product comprises on a 100 weight percent basis from about 40 to 60 weight percent acrylamide and from about 40 to 60 weight percent water.

31. The process of claim 13 wherein said quantity of acrylonitrile so charged to each zone ranges from about 0.75 to 1.25 times the total acrylonitrile charged divided by the number of locations at which acrylonitrile is charged.

32. The process of claim 13 wherein the total system conversion of starting acrylonitrile to acrylamide is at least about 75%.

33. A process for hydrolyzing with a fixed bed catalyst acrylonitrile to acrylamide comprising continuously passing sequentially through three substantially isothermal tubular reaction zones under homogeneous liquid phase conditions at a system weight hourly space velocity ranging from about 0.1 to 10 hours $^{-1}$ a reactant composition comprised of acrylonitrile and water, such reactant composition being achieved by feeding substantially all the water to such first zone and by feeding incrementally to each such zone from about 0.2 to 0.5 times the total quantity of acrylonitrile charged to all such zones, each of said zones containing a fixed bed of Raney copper catalyst which has an initial catalytic activity of at least about 0.25 based upon a starting feed composition of 35 weight percent acrylonitrile and 65 weight percent water, total composition basis and using an arithmetic mean catalyst bed temperature of 210°F., a catalyst bed volume of about 50 cubic inches and an evaluation weight hourly space velocity which is sufficient to produce 80% conversion of acrylonitrile to acrylamide, said zones being maintained at temperatures ranging from about 100° to 300°F, there being a cumulative conversion of acrylonitrile to acrylamide in each such zone in the range of from about 60 to 90% based on total added acrylonitrile in each such zone and all prior zones, said process resulting in a total system conversion of starting acrylonitrile to acrylamide of at least about 75%, same basis.

34. The process of claim 33 wherein said reactant composition after passing through said third reaction zone is subjected to stripping to remove therefrom substantially completely all unreacted acrylonitrile thereby to produce an aqueous solution of from about 40 to 60 weight percent acrylamide with the balance up to 100 weight percent being water.

35. The process of claim 34 wherein acrylonitrile so removed is recycled to said reactant composition, as fed to said first zone.

36. The process of claim 1 wherein there are two of said reaction zones and wherein the quantity of acrylonitrile so added at each location ranges from about 0.5 to 1.5 times the total quantity of acrylonitrile charged to all such locations divided by the total number of such locations.

37. The process of claim 13 wherein the calculated weight ratio of total acrylonitrile charged to total water charged ranges from about 0.4 to 0.7.

38. In an improved process for hydrolyzing with a fixed bed catalyst acrylonitrile to acrylamide of the type employing three tubular reaction zones through which in normal process operation a reactant composition comprising acrylonitrile and water is passed sequentially, substantially isothermally, and under liquid phase conditions, such reactant composition being achieved by feeding substantially all of the water to the first of such reaction zones and by feeding incrementally to each such zone from about 0.2 to 0.5 times the total quantity of acrylonitrile charged to all such zones, each of said zones containing a fixed bed of Raney copper catalyst which has an initial catalytic activity of at least about 0.25 based upon a starting feed composition of 35 weight percent acrylonitrile and 65 weight percent water, total composition basis and using an arithmetic mean catalyst bed temperature of 210°F., a catalyst bed volume of about 50 cubic inches and an evaluation weight hourly space velocity which is sufficient to produce 80% conversion of acrylonitrile to acrylamide, the improvement which comprises the steps of
a. removing from service one of said three tubular reaction zones,
b. passing such reactant composition sequentially, substantially isothermally, and under liquid phase conditions through the remaining two of said three tubular reaction zones at a system weight hourly space velocity in the range from about 0.1 to 10 hours $^{-1}$ which maintaining the first of said remaining two reaction zones at a temperature ranging from about 100° to 300°F and the second of said remaining two reaction zones at a temperature ranging from about 100° to 300°F., the cumulative conversion of starting acrylonitrile to acrylomide after passing through both of said remaining two reaction zones being in the range from about 60 to 99% based on total added acrylonitrile in each such zone and all prior zones.

39. In an improved process for hydrolyzing with a fixed bed catalyst acrylonitrile to acrylamide of the type employing three tubular reaction zones through which in normal process operation a reactant composition comprising acrylonitrile and water is passed sequentially, substantially isothermally, and under liquid phase conditions, such reactant composition being achieved by feeding substantially all of the water to the first of such reaction zones and by feeding incrementally to each such zone from about 0.2 to 0.5 times the total quantity of acrylonitrile charged to all such zones, each of said zones containing a fixed bed of Raney copper catalyst which has an initial catalytic activity of at least about 0.25 based upon a starting feed composition of 35 weight percent acrylonitrile and 65 weight percent water, total composition basis and using an arithmetic mean catalyst bed temperature of 210°F., a catalyst bed volume of about 50 cubic inches and an evaluation weight hourly space velocity which is sufficient to produce 80% conversion of acrylonitrile to acrylamide, the improvement which comprises the steps of a. removing from service one of said three tubular reaction zones,
b. passing such reactant composition sequentially, substantially isothermally, and under liquid phase conditions through the remaining two of said three tubular reaction zones at a system weight hourly space velocity in the range from about 0.5 to 2.0 hours $^{-1}$ while maintaining the first of said remaining two reaction zones at a temperature ranging from about 150° to 260°F., the cumulative conversion of starting acrylonitrile to acrylomide after passing through both of said remaining two reaction zones being in the range from about 70 to 90% based on total added acrylonitrile in each such zone and all prior zones.

* * * * *